J. A. COLE.
TRUCK LOADER.
APPLICATION FILED DEC. 7, 1917.
1,392,916.
Patented Oct. 11, 1921.
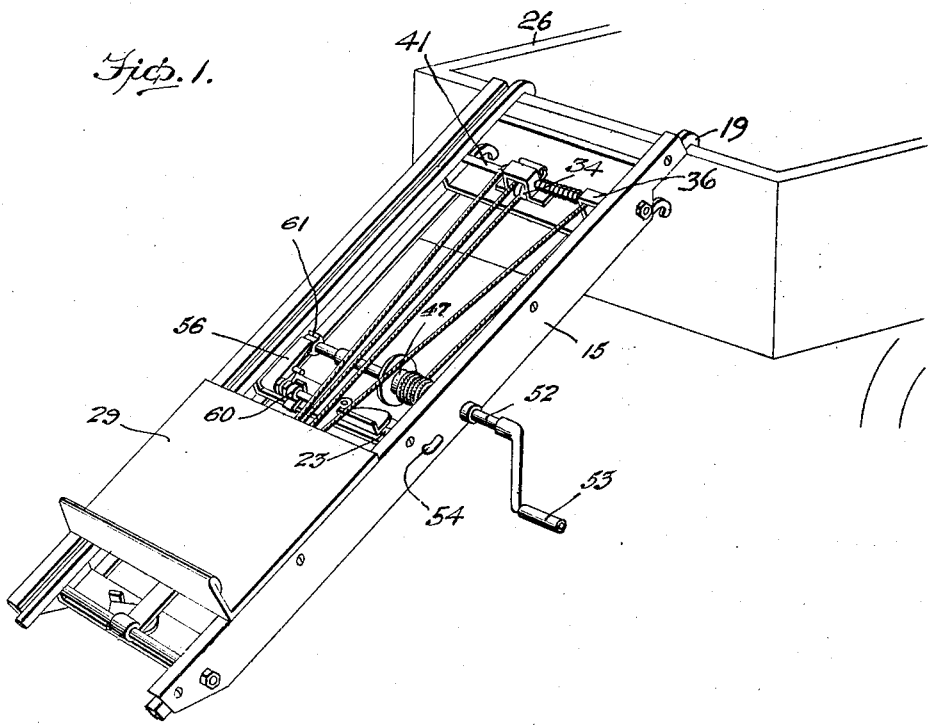
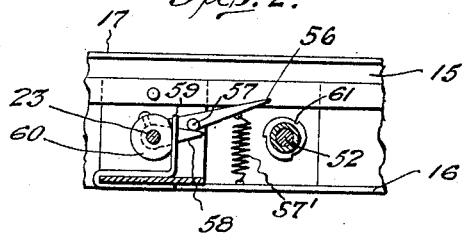
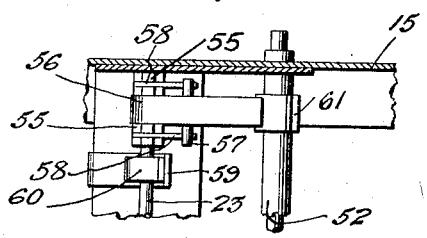
John A. Cole INVENTOR
BY Victor J. Evans ATTORNEY
WITNESS:

UNITED STATES PATENT OFFICE.

JOHN A. COLE, OF NEW YORK, N. Y.

TRUCK-LOADER.

1,392,916. Specification of Letters Patent. Patented Oct. 11, 1921.

Application filed December 7, 1917. Serial No. 206,045.

*To all whom it may concern:*

Be it known that I, JOHN A. COLE, a citizen of the United States, residing at New York city, in the county of New York and State of New York, have invented new and useful Improvements in Truck-Loaders, of which the following is a specification.

This invention has reference to a loading device for trucks and the like in which a load carrying platform is arranged on a skid and moved thereover by cable operated means and the object of the invention is to produce mechanism for controlling the said operating means whereby the platform is sustained at varying desired positions on the skid.

Other objects will appear as the nature of the invention is better understood, reference being had to the drawings which accompany and form part of this specification.

In the drawings:—

Figure 1 is a perspective view illustrating a truck loader attached to a wagon body and provided with my improvement.

Fig. 2 is an enlarged detail sectional view taken transversely through the drum shaft and through the rod which carries the improvement.

Fig. 3 is a plan view of the parts illustrated in Fig. 2, a portion of the skid being in section.

In Fig. 1 of the drawings a skid 15 has its side bars provided at one of their ends with hooks 19 to engage the body of a truck 26. On the skid there is a slidable platform 29 to which is connected an operating cable. The cable is secured around a drum 47 mounted on a drum shaft 52 that is provided with an operating handle 53, and is from thence trained around a suitable pulley 36 on a shaft 41 journaled upon the sides of the skid. The cable is from thence trained around suitable pulleys, not shown, on the under face of the platform, over other pulleys on the shaft 41 and has its end connected to the under face of the platform. On the drum shaft 52, adjacent to one of the sides of the skid 15 there is a ratchet wheel 61. To one side of the drum shaft there is journaled in bearing openings in the side members of the skid a rod 23. This rod has one of its ends offset to provide a handle 54, arranged on the outer face of one of the side members of the skid. Arranged loosely between spaced collars 55 on the rod 23 is a dog 56. The dog has a lateral extension 57 and is influenced by a spring 57' in the direction of the ratchet wheel 61. On the rod 23 are fingers 58 disposed below the lateral extension 57 of the dog 56. When the rod is turned to one position the fingers 58 will contact with the extensions 57 of the dog and swing the dog against the influence of its spring to bring the said dog out of engagement with the ratchet wheel 61, thus permitting the turning of the shaft 52 on the winding or unwinding of the cable on the drum 47. The rod 23 is normally retained against turning through the medium of a flat spring 59 suitably secured on the skid and bearing against a collar 60 on the rod 23. The dog 56 normally engages the ratchet wheel, and consequently holds the shaft 52 from turning, so that the platform 29 may be held at varying desired positions on the skid.

Having thus described the invention, what I claim is:

1. A loading device, including a skid having a cable operated platform slidable thereon, a lever operated drum for the cable and a ratchet wheel on the shaft for the drum; of a spring influenced dog normally engaging the ratchet wheel and said dog having a lateral extension thereon, a rod journaled transversely of the skid having a handle on one end thereof, a finger on the rod in the path of contact with the lateral extension on the dog, and spring means for normally holding the rod against turning.

2. A loading device including a skid, a platform arranged for travel thereon, a cable for moving the platform, a hand operated drum around which one of the ends of the cable is secured, a ratchet wheel on the drum shaft and a spring influenced dog engaging said ratchet and said dog having lateral extensions; a rod journaled transversely of the skid and having a handle on one end thereof, spaced fingers fixed to the rod and disposed in the path of contact with the extensions on the dog, a collar fixed on the rod, and a flat spring contacting with the collar for holding the rod against turning and for sustaining the rod in position when the same is turned.

In testimony whereof I affix my signature.

JOHN A. COLE.